Figure 2:
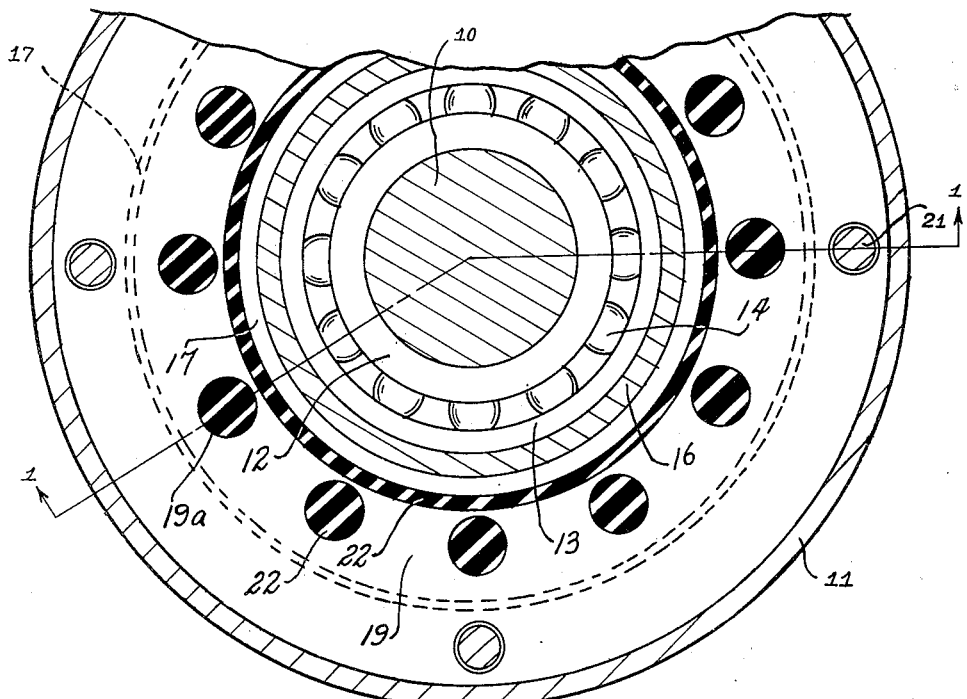

May 8, 1951 W. O. MICHELSEN 2,551,621

BEARING ASSEMBLY FOR CENTRIFUGES AND THE LIKE

Filed May 4, 1948

INVENTOR
WILLIAM O. MICHELSEN
BY Davis, Hopie & Faithfull
ATTORNEYS

Patented May 8, 1951

2,551,621

UNITED STATES PATENT OFFICE 2,551,621

BEARING ASSEMBLY FOR CENTRIFUGES AND THE LIKE

William O. Michelsen, Poughkeepsie, N. Y., assignor to The De Laval Separator Company, New York, N. Y., a corporation of New Jersey Application May 4, 1948, Serial No. 25,014

13 Claims. (Cl. 308—184)

This invention relates to bearing assemblies for centrifuge spindles, and the like, which are subject to considerable vibration incident to their rotation. More particularly, the invention has reference to an improved bearing assembly for dampening such vibrations.

It is common practice to surround the spindle bearing with a yielding radial support which cushions the lateral vibrations of the spindle and its bearing, thereby reducing the vibrations transmitted to the stationary frame or housing in which the parts rotate. The yielding radial support has generally taken the form of a series of radial springs or an annular rubber cushion disposed around the bearing. However, both of these forms as used heretofore have met with certain difficulties. The radial springs, for example, sometimes fail to center the spindle properly after the bearing assembly is installed, which brings about an undesirable condition. While the use of a rubber or similar cushion largely or entirely avoids this difficulty, the inherent characteristics of the rubber have resulted in other difficulties, due particularly to the stresses to which the rubber is subjected when compressed in the usual manner around the bearing.

The present invention is directed to the provision of an improved bearing assembly having one or more rubber-like parts for cushioning the vibrations of the rotating spindle, the assembly being arranged to provide a simple, rugged and unitary construction which is easy to install or remove and which affords highly effective dampening characteristics over a long period of time.

A bearing assembly made according to the invention comprises a stationary housing surrounding the spindle with a clearance, and a bearing in the housing closely surrounding the spindle. An annular body of rubber-like material is disposed in a clearance space between the outer race of the bearing and the side wall of the housing; but instead of completely filling this space in the radial direction, as commonly was the case heretofore, the rubber-like body is spaced from the inner and outer confines of the annular clearance space. The body is held in this position by a pair of annular spacing elements located in different planes normal to the spindle axis. One of these elements is movable radially with the spindle and the bearing which it surrounds and has its outer edge embedded in the rubber-like body; while the other spacing element is held at its outer periphery by the side wall of the stationary housing and has its inner edge embedded in the rubber-like body. Preferably, the spindle is movable endwise on a yielding axial support, and to accommodate such endwise movement one of the spacing elements has an axial sliding contact with the part engaging its unembedded periphery, that is, with either the outer race of the bearing or the side wall of the housing.

With this construction, the rubber-like body is stressed in shear through the radial spacing elements by the spindle and its bearing, the radial vibrations of which are dampened by the yielding resistance of the body to shearing stresses. This yielding shearing resistance of the body is uniform around the entire circumference of the body so that the latter acts through the spacing elements to center the spindle and bearing accurately in the stationary housing. The rubber-like body and the spacing elements providing the resilient centering action are made as a unit which may be easily removed from the housing, particularly since the spacing elements hold the body away from the adjacent parts to which it might otherwise adhere in time.

In the preferred construction, one of the spacing elements is a radial flange extending outwardly from a ring closely surrounding the outer race of the bearing and in which the latter is slidable axially, and the other spacing element is a radial flange in the form of a disc extending inwardly from the side wall of the housing and removably secured thereto by a cover, the rubber-like body being molded around the free edges of the flanges and into perforations therein. Also, the outer race is yieldingly supported for axial sliding movement in the surrounding ring. The yielding axial support preferably comprises a rubber-like annular member seated on the bottom of the housing, and an anti-friction annulus secured between the top of the member and the outer race by means of studs projecting downwardly into the rubber-like member but spaced at their lower ends from the bottom of the housing. Thus, the studs serve the dual function of preventing contact between the housing and the anti-friction annulus and limiting downward movement of the latter and the rotating parts due to yielding of the axial support.

Figure 1:
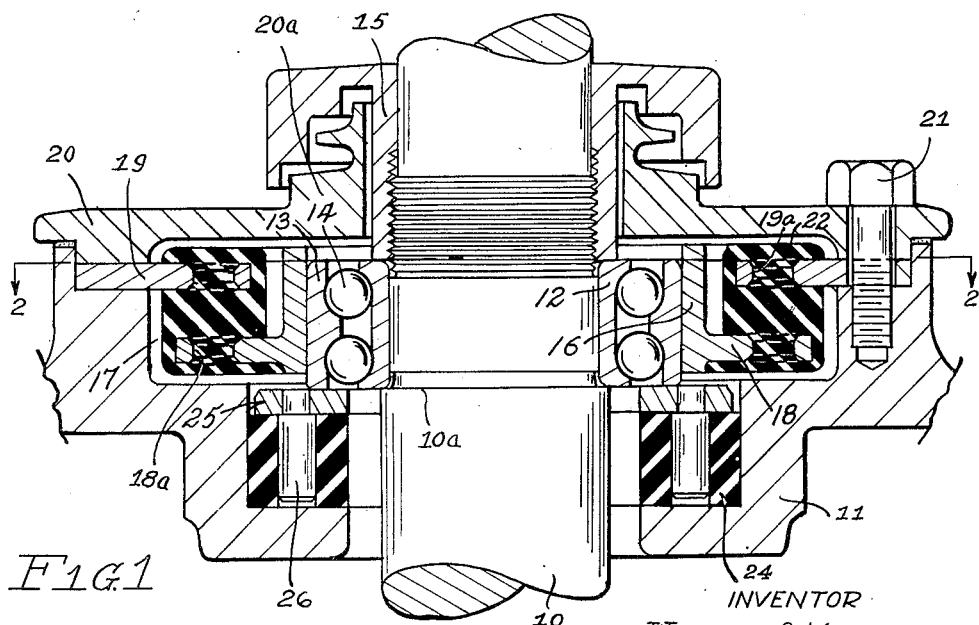

For a better understanding of the inventon, reference may be had to the accompanying drawings, in which Fig. 1 is a vertical sectional view of part of a centrifuge embodying one form of the invention, the section being taken on the line 1—1 in Fig. 2, and Fig. 2 is a horizontal sectional view on the line 2—2 in Fig. 1.

Referring to the drawings, the vertical spindle 10 extends through a surrounding stationary housing 11 which is removably secured in or made integral with the centrifuge frame (not shown). A substantial radial clearance is provided between the spindle and the housing 11 to allow lateral movements of the spindle incident to its rotation. The spindle is rotatable in a bearing comprising an inner race 12, an outer race 13 and intermediate balls 14. The inner race 12 closely surrounds the spindle and is held against a shoulder 10a thereof by means of a nut 15 screwed down on the spindle against the top of the inner race, whereby the latter and the spindle are secured against the relative axial movement.

The outer race 13 is closely surrounded by a ring 16 in which the outer race is slidable axially. Between the ring 16 and the side wall of housing 11 is a clearance space 17 of substantial extent in both the radial and axial directions. A radial flange 18 extends outwardly from the lower part of ring 16 into the clearance space 17, the outer edge of the flange, however, being spaced from the side wall of the housing. The flange 18, as shown, is integral with the ring 16 and has near its outer edge a series of circumferentially spaced perforations 18a. A second radial flange in the form of a disc 19 extends inwardly from the side wall of housing 11 into the upper part of clearance space 17, the inner edge of the disc being spaced from the ring 16. The disc 19 fits closely in a recess in the housing to prevent radial movement of the disc, and it is held in the recess by an overlying cover 20 removably secured to the housing by bolts 21. At its inner portion, the disc 19 is provided with a series of circumferentially spaced perforations 19a overlying the perforations 18a.

The flanges 18 and 19 form spacing elements for an annular body 22 made of rubber or other similar material having the characteristics of resiliency and ability to be distorted without permanent deformation. The body 22 does not completely fill the space 17 in the radial direction. On the contrary, it is spaced from the ring 16 and from the side wall of the housing, the body being held in this position by the flanges 18 and 19 which are embedded in it. More particularly, the body 22 is molded around the inner edge of flange 19 and around the outer edge of flange 18 and also through the perforations 18a and 19a. A firm hold is thus provided above, below and through the flanges, as well as at the free edges thereof, to prevent them from being loosened from the rubber-like body.

The outer race 13 is slidable axially in the ring 16 on a yielding axial support for the spindle. The axial support comprises an annular rubber-like member 24 seated on the bottom of the housing below the outer race. The member 24 is closely confined by the side wall of the housing but is spaced from the spindle 10 which extends through the member. An annulus 25 is interposed between the top of the rubber-like member 24 and the bottom of the outer race 13, and has a smooth upper surface so that the outer race can slide radially on the annulus and also move vertically thereon incident to flexing of the member 24. The annulus 25 is held in spaced relation to the side wall of the housing by means of a series of circumferentially spaced studs 26 projecting downwardly from the annulus into the rubber-like member 24. The holes for receiving the studs 26 extend completely through the member 25 from top to bottom. The lower ends of the studs, however, are located in these holes in spaced relation to the bottom of the housing.

The operation of the assembly is as follows: Radial vibrations of the spindle 10 during its rotation are transmitted through the bearing and the surrounding ring 16 to the radial flange 18. The radial vibrations of flange 18 in the clearance space 17 cause the lower part of the rubber-like body 22 to move laterally relative to the side wall of the housing, such lateral movements, however, being insufficient in the normal rotation of the parts to cause contact between the body 22 and the housing. These lateral movements of the lower part of the body 22 stress the latter in shear, since the upper part of the body is held by the fixed flange 19 and is spaced from the side walls of the housing and the ring 16. Accordingly, the radial vibrations of the spindle are yieldingly opposed and dampened by the resistance to shear of that part of the rubber-like body 22 lying between the planes of the two spacing elements or flanges 18 and 19. This resistance to shear is uniform around the entire circumference of the body 22, so that the latter acts through the spacing elements 18 and 19 to center the spindle accurately in the housing 11.

Any variations in the axial thrust of the spindle are cushioned by the lower rubber-like member 24, and this axial cushioning effect can take place simultaneously with the radial cushioning effect afforded by the yielding shear resistance of the body 22. That is, the outer race 13 can slide radially on the annulus 25 against the yielding shear resistance of the body 22, and at the same time it can slide axially in the surrounding ring 16 and on the annulus 25 incident to flexing of the rubber-like member 24. The studs 26, by positively locating the annulus 25 on the member 24, prevent contact of the annulus with the housing and the vibration noise which would attend such contact. In addition, any abnormal downward thrust of the spindle will cause the lower ends of the studs to engage the bottom of the housing, thereby positively preventing further downward movement of the rotating parts and avoiding undue stresses on the axial cushion 24.

In the event of abnormal radial movements of the spindle, the lower part of the rubber-like body 22 will contact the side wall of the housing, and the upper part of the body will contact the outer wall of ring 16. In this way, the shear resistance of the body 22 is supplemented by the compression resistance of those parts of the body covering the free edges of the flanges 18 and 19, and metal-to-metal contact of the parts is avoided. Also, it will be observed that in the event of fracture of the member 22 there is sufficient rubber-like material at the free edges of the flanges to prevent metal-to-metal contact and cushion the radial vibrations.

In some instances, it may be desirable to provide a safety bearing to prevent contact of any part of the rubber-like body 22 with the housing or the ring 16. I have illustrated such a safety bearing which is formed in part by the nut 15 and in part by an upwardly projecting boss 20a on the cover, which surrounds the nut 15 in spaced relation thereto. The spacing between the nut 15 and the boss 20a is such as to allow normal radial vibrations of the spindle. However, abnormal radial vibrations are prevented by contact between the nut 15 and the boss 20a.

It will be observed that the yielding radial support provided by the rubber-like body 22 and the spacing elements 18 and 19 can be removed as a unit from the housing after the cover 20 is removed. Also, the yielding axial support comprising the rubber-like member 24 and the annulus 25 can be removed as a unit; and by making the housing 11 separate from the centrifuge frame, the entire bearing assembly can be removed with the housing. As shown, the outer race 13 normally projects somewhat below the surrounding ring 16 so that the latter is spaced from the annulus 25. The studs 26 hold the annulus 25 spaced a sufficient distance from the inner race 12 to prevent contact between these parts in the normal radial movements of the bearing.

I claim:

1. A bearing assembly for the spindle of a centrifuge, or the like, which comprises a stationary housing surrounding the spindle with a clearance, a bearing in the housing closely surrounding the spindle and having inner and outer races, there being an annular space between the outer race and the side wall of the housing, an element closely surrounding the outer race and movable radially therewith, said element extending outwardly from the outer race into said space and clearance but having a clearance between its outer periphery and the side wall of the housing, an annular element extending inwardly into said first clearance from the side wall of the housing and held by said wall against radial movement, said last element being spaced axially from said first element and having a clearance between its inner periphery and the inner wall of said space, and an annular body of rubber-like material disposed in said first clearance and secured to said elements with clearances between the body and the inner and outer walls of said space.

2. A bearing assembly according to claim 1, in which said elements are perforated, the rubber-like body being molded into the perforations.

3. A bearing assembly according to claim 1, in which the rubber-like body is molded around said outer periphery of one of the elements and said inner periphery of the other element.

4. A bearing assembly for the spindle of a centrifuge, or the like, which comprises a stationary housing surrounding the spindle with a clearance, a bearing in the housing closely surrounding the spindle and having inner and outer races, there being an annular clearance space between the outer race and the side wall of the housing, an annular body of rubber-like material disposed in said space with clearances at the inner and outer walls of the body, a pair of annular spacing elements in the clearance space and disposed in different planes normal to the spindle axis, one of said elements having its outer edge embedded in said body and its inner periphery contacting part of the outer race, and the other element having its inner edge embedded in said body and its outer periphery contacting part of the side wall of the housing, one of said peripheries having an axial sliding engagement with its contacting part, and a yielding axial support on which the spindle is movable to effect relative axial sliding of said last periphery and its contacting part.

5. A bearing assembly for the spindle of a centrifuge, or the like, which comprises a stationary housing surrounding the spindle with a clearance, a bearing in the housing closely surrounding the spindle and having inner and outer races, the inner race being secured to the spindle against axial movement relative thereto, a ring closely surrounding the outer race and in which said outer race is slidable axially, there being an annular clearance space between the ring and the side wall of the housing, a yielding axial support on which the outer race is slidable in the ring, a radial flange on the ring extending outwardly into said clearance space and spaced at its outer periphery from the side wall of the housing, a radial flange extending inwardly from the side wall of the housing into the clearance space and spaced at its inner periphery from the ring, said flanges being spaced apart axially, and an annular body of rubber-like material disposed in said space and secured to said flanges with a clearance between the ring and said body and a clearance between the housing and said body.

6. A bearing assembly according to claim 5, in which said yielding axial support is disposed in the housing below the bearing and engages the outer race, the axial support being spaced from the inner race and the ring.

7. A bearing assembly according to claim 5, in which said yielding axial support includes a rubber-like annular member seated on the bottom of the housing below the outer race, an annulus interposed between said member and the outer race and on which the outer race is adapted to slide, and a stud in said member for limiting the movement of said annulus toward the bottom of the housing.

8. A bearing assembly according to claim 5, in which said yielding axial support includes a rubber-like annular member seated on the bottom of the housing below the outer race, an annulus interposed between said member and the outer race and on which the outer race is adapted to slide, the annulus being spaced from the side wall of the housing, and a stud projecting downwardly from the annulus into said member to locate the annulus on said member, the lower end of the stud being spaced from the bottom of the housing and engageable therewith to limit downward movement of the annulus on said member.

9. A bearing assembly according to claim 5, in which said flanges are perforated, said rubber-like body being molded into the perforations.

10. A bearing assembly according to claim 5, in which said rubber-like body is molded around said peripheries of the flanges.

11. A bearing assembly according to claim 5, in which said inwardly extending flange is a disc removable from the housing, the assembly also including a cover removably secured to the housing over the disc to hold the disc in place.

12. A bearing assembly according to claim 5, in which said inwardly extending flange overlies the outwardly extending flange.

13. In a bearing assembly for the spindle of a centrifuge, or the like, which comprises a stationary housing surrounding the spindle with a clearance, a bearing in the housing closely surrounding the spindle and having inner and outer races, the inner race being secured to the spindle against axial movement relative thereto, an annulus surrounding the spindle and axially supporting the outer race for radial sliding movement on the annulus, said annulus being spaced from the side wall of the housing, a rubber-like member surrounding the spindle and interposed between said annulus and the bottom of the housing, and a stud projecting downwardly from the annulus into said member to locate the annulus on said member, the lower end of the stud being spaced from the bottom of the housing and engageable therewith to limit downward movement of the annulus on said member.

WILLIAM O. MICHELSEN.

REFERENCES CITED

The following references are of record in the file of this patent:

UNITED STATES PATENTS

| Number | Name | Date |
| --- | --- | --- |
| 2,012,997 | Junkers | Sept. 3, 1935 |
| 2,304,847 | Piron | Dec. 15, 1942 |
| 2,439,751 | Olsen | Apr. 13, 1948 |

FOREIGN PATENTS

| Number | Country | Date |
| --- | --- | --- |
| 200,452 | Great Britain | July 12, 1923 |